United States Patent [19]

Barbero

[11] Patent Number: 4,875,307
[45] Date of Patent: Oct. 24, 1989

[54] WINDOW FOR A MOTOR VEHICLE DOOR

[75] Inventor: Mario Barbero, Torino, Italy

[73] Assignee: Fiat Auto S.p.A., Torino, Italy

[21] Appl. No.: 244,272

[22] Filed: Sep. 14, 1988

[30] Foreign Application Priority Data

Sep. 14, 1987 [IT] Italy .................. 67779 A/87

[51] Int. Cl.⁴ ...................... E05F 11/38; E06B 7/16
[52] U.S. Cl. ............................ 49/374; 49/440; 49/488
[58] Field of Search ............. 49/374, 375, 376, 377, 49/440, 441, 502, 488

[56] References Cited

U.S. PATENT DOCUMENTS

| | | | |
|---|---|---|---|
| 4,417,419 | 11/1983 | Rossie et al. | 49/440 X |
| 4,457,111 | 7/1984 | Koike | 49/441 |
| 4,625,459 | 12/1986 | Warner | 49/488 |
| 4,648,205 | 3/1987 | Ono | 49/502 X |
| 4,656,784 | 4/1987 | Brachmann | 49/440 X |
| 4,782,629 | 11/1988 | Mori et al. | 49/502 X |

*Primary Examiner*—Philip C. Kannan
*Attorney, Agent, or Firm*—Sughrue, Mion, Zinn, Macpeak & Seas

[57] ABSTRACT

The rear edge of the glass of a window for a motor vehicle door is provided with two appendages which are guided for sliding in a channel formed in a weather strip fixed to the window frame. This weather strip has an auxiliary portion which ensures the seal between the door frame and the glass and the seal between the door frame and the body of the motor vehicle. The arrangement is such that the outer surface of the glass is flush with the surfaces of the bodywork adjacent the glass.

4 Claims, 1 Drawing Sheet

U.S. Patent  Oct. 24, 1989  4,875,307

WINDOW FOR A MOTOR VEHICLE DOOR

DESCRIPTION

The present invention relates to a window for a motor vehicle door, of the type comprising a frame defining a window opening and a pane of glass guided vertically in the frame and arranged so that, when it is in the raised position, its outer surface is substantially flush with the adjacent surfaces of the bodywork.

Solutions of this type have already been produced and enable the characteristics of the motor vehicle to be improved from the aerodynamic and aesthetic points of view.

The object of the invention is to produce a window of the type indicated above, which is particularly simple and functional.

In order to achieve this object, the subject of the invention is a window of the type indicated at the beginning of the present description, characterised in that the rear edge of the glass is provided with two appendages which are guided for sliding in a channel formed in a weather strip fixed to the window frame, and in that the weather strip has an auxiliary portion serving both as the seal between the frame of the motor vehicle door and the glass and as the seal between the door frame and the body.

Figure 1:
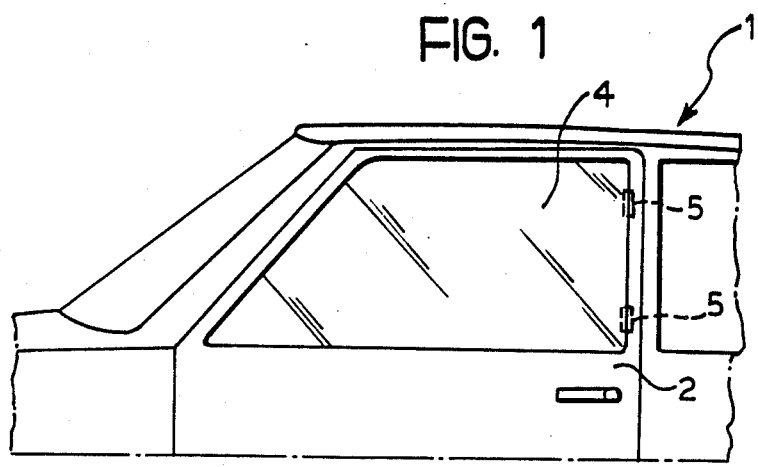
Figure 2:
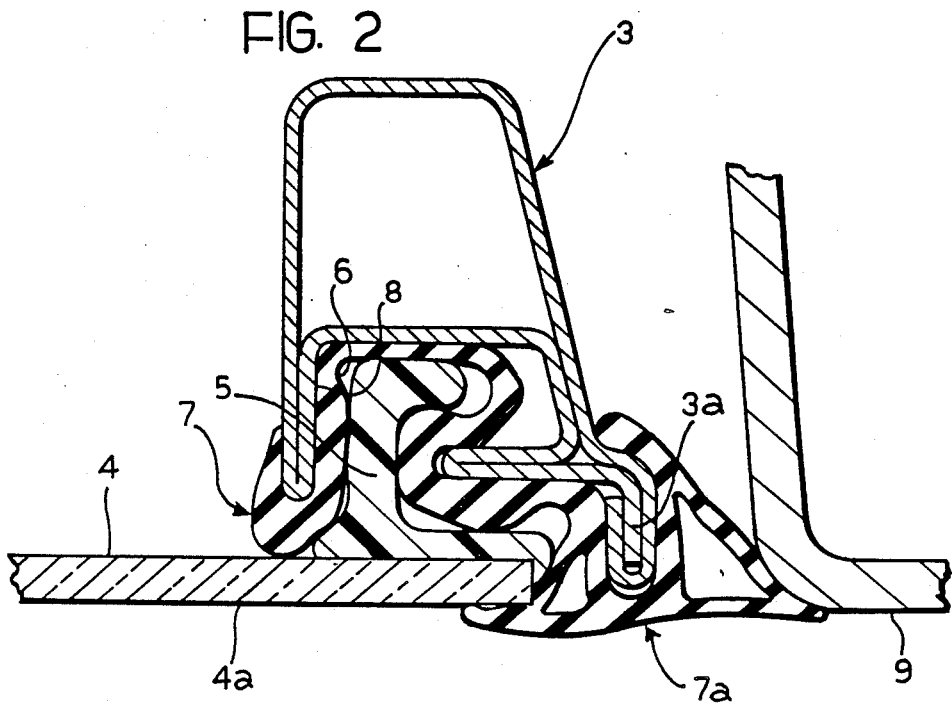

The invention will now be described with reference to the appended drawings, provided purely by way of non-limiting example, in which:

FIG. 1 is a schematic side view of a motor vehicle window according to the invention, and FIG.2 is a section taken on the line II—II of FIG. 1.

With reference to the drawings, the window of a motor vehicle door 2 is indicated 1 and comprises a sheet metal frame 3 in which a pane of glass 4 is guided for vertical sliding.

The rear edge of the glass 4 is provided wih two appendages 5, one of which is shown on an enlarged scale in FIG. 2. Each appendage 5 has a body of plastics material, for example expanded polyurethane, moulded onto the inner surface of the glass 4. The body of the appendage 5 is substantially L-shaped in section, as can clearly be seen from FIG. 2. The two appendages 5 are guided for sliding in a channel 6 of corresponding section formed in a rubber weather strip 7 fixed to the frame 3 of the door. The part of the weather strip 7 which is fixed to the frame 3 is housee in a seat 8 defined by the sheet metal constituting the frame.

As can be seen in FIG. 2, the appendages 5 project inwardly of the passenger compartment, so that the glass is supported and guided with its outer surface 4a substantially flush with the surface 9 of the bodywork adjacent the glass.

The weather strip 7 has an auxiliary portion 7a which is anchored to a flange 3a of the frame and ensures both the seal between the glass and the door frame and the seal between the door frame and the body of the motor vehicle, when the door is closed.

In this way, the whole structure is relatively simple, economical to construct, and reliable.

The surface of the part of the weather strip 7 which is used to guide the appendages 5 is treated so as to achieve optimal sliding conditions for the appendages 5.

I claim:

1. A window for a motor vehicle door, comprising a frame (3) defining a window opening and a pane of glass (4) guided vertically in the frame (3) and arranged so that, when it is in the raised position, its outer surface is substantially flush with the adjacent surfaces of the bodywork of the motor vehicle, wherein the rear edge of the glass is provided with two appendages (5) which are guided for sliding in a channel (6) formed in a weather strip (7) fixed to the window frame (3) and having an auxiliary portion (7a) which serves both as the seal between the glass (4) and the door frame (3) and as the seal between the door frame (3) and the body of the motor vehicle.

2. A window according to claim 1, wherein each appendage (5) has a body of plastics material moulded onto the inner surface of the glass (4).

3. A window according to claim 1, wherein each appendage (5) is substantially L-shaped in section, and in that the channel (6) for guiding the appendages (5) has a corresponding section.

4. A window according to claim 1, wherein the part of the weather strip (7) in which the channel (6) is formed is fixed in a seat (8) in the window frame (3), and in that the auxiliary portion (7a) of the weather strip (7) is anchored to a flange (3a) of the frame (3).

* * * * *